(No Model.)
F. M. LEAVITT.
CLUTCH FOR POWER PRESSES.
No. 370,198. Patented Sept. 20, 1887.
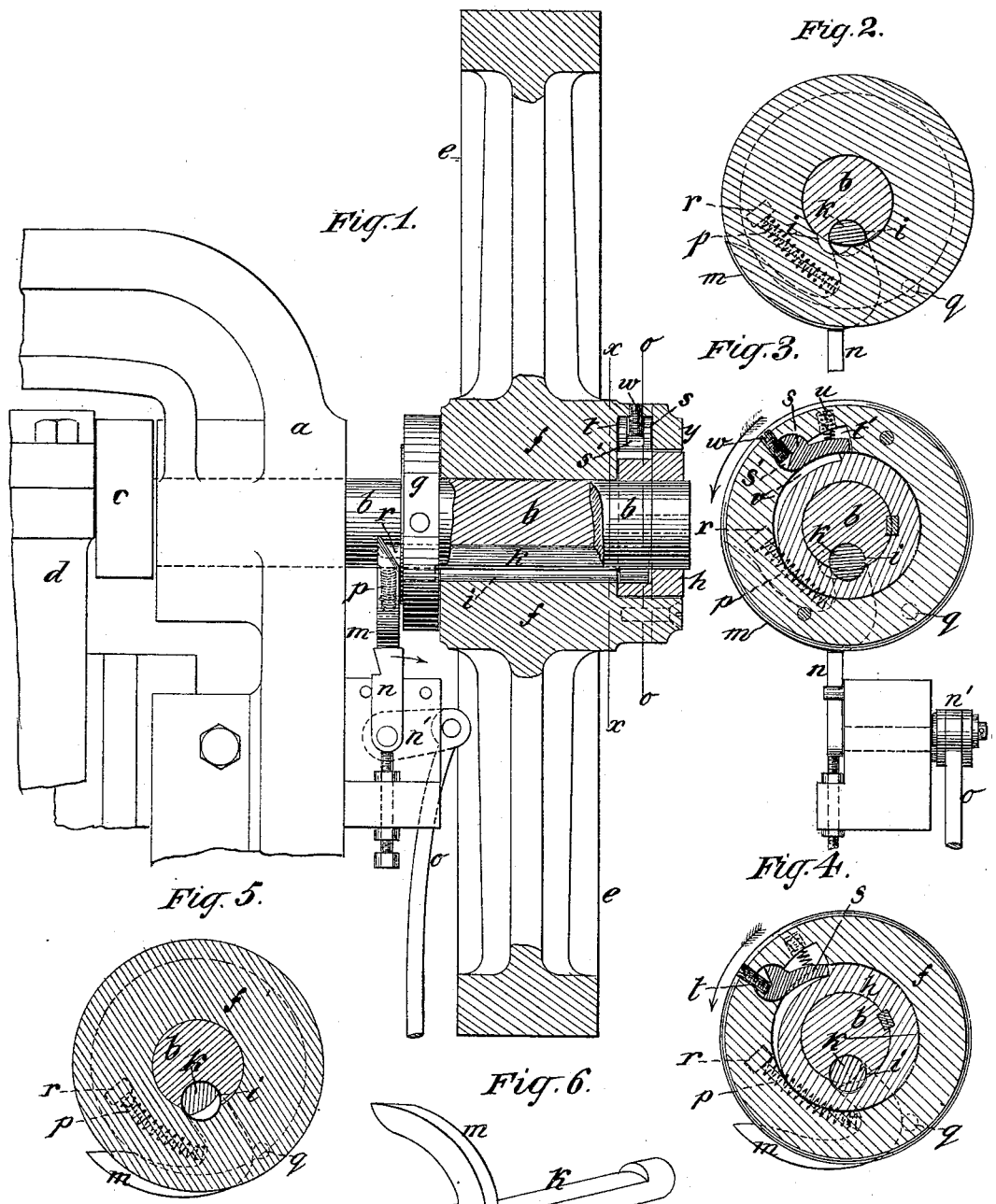
WITNESSES
John Becker
Jno. E. Gavin
INVENTOR
Frank M. Leavitt.
by Chas. M. Higgins
Attorney.

UNITED STATES PATENT OFFICE.

FRANK M. LEAVITT, OF BROOKLYN, NEW YORK, ASSIGNOR TO THE E. W. BLISS COMPANY, OF SAME PLACE.

CLUTCH FOR POWER-PRESSES.

SPECIFICATION forming part of Letters Patent No. 370,198, dated September 20, 1887.

Application filed March 17, 1887. Serial No. 231,314. (No model.)

*To all whom it may concern:*

Be it known that I, FRANK M. LEAVITT, of Brooklyn, Kings county, New York, have invented certain new and useful Improvements in Clutches for Power-Presses and other Machinery, of which the following is a specification.

My invention relates to that class of clutches more especially adapted for power-presses to clutch the revolving fly-wheel or driving-pulley to the main crank-shaft of the press, so as to effect one revolution of the shaft each time the clutch is operated.

The clutch generally consists of a half-round rotary key fitted in a round keyway bored partly through the shaft and the hub of the fly-wheel at their junction, and so arranged that when the key is partially rotated or tilted in one direction it engages the fly-wheel to the shaft, and when tilted in the other direction the fly-wheel is unclutched and revolves freely. With this clutch is combined a pawl-stop or retarding device between the fly-wheel and the shaft to prevent the shaft "running away" at the moment of release or revolving independently in advance of the fly-wheel, due to extra momentum of the shaft and its attachments or other causes.

My invention lies in specific improvements in the construction of the parts, as hereinafter fully set forth and claimed.

In the drawings annexed, Figure 1 gives a fragmentary view in elevation of a power-press provided with my invention. This view shows the fly-wheel and the shaft in section, to illustrate the clutch and pawl-stop. Fig. 2 is a cross-section on *x x*, and Fig. 3 a cross-section on *o o*, both showing the parts in the same position, with the clutch disengaged and the fly-wheel revolving freely on the shaft. Fig. 4 is a section on *x x*, and Fig. 5 a section on *o o*, both showing the clutch-key tilted to engage the fly-wheel to the shaft, which are thus revolved together. Fig. 6 is a perspective view of the clutch-key removed.

Referring to Fig. 1, *a* indicates the frame of the press, and *b* the main crank-shaft, which is mounted in the usual manner in bearings in the frame, and formed with the short crank *c*, which operates the pitman *d*, to which the dies or other tools are connected in the usual way, the said parts being shown only in a fragmentary manner in the drawings, as the same are well understood and form no part of my invention. One end of the crank-shaft overhangs one side of the frame, as shown, and on the same is mounted the fly-wheel *e f*, which is also usually the driving-pulley, as the driving-belt is applied to the periphery thereof. The hub *f* of the fly-wheel is mounted to revolve loosely on the shaft between two collars, *g h*, fixed to the shaft. The inner collar, *g*, is of large diameter and abuts against the inner end of the hub of the fly-wheel, as shown best in Fig. 1, while the outer collar, *h*, is of smaller diameter and fits into a recess in the outer end of the hub, abutting against the hub at the bottom of said recess, as well shown in Fig. 1. Now a round or cylindrical keyway, *i*, is bored endwise or axially through the collars *g h* and through the shaft *b* and the hub of the fly-wheel in the line of junction of the shaft with the hub, so that said cylindrical keyway lies partly in the shaft and partly in the hub, but more than half in the shaft, as will be understood from Figs. 2, 3, and 4. Now in the keyway is fitted a rotary or tilting cylindrical clutch-key, *k*, (shown removed in Fig. 6,) each end of which is completely round or cylindrical and fits in the undivided round part of the keyway bored in the collars *g* and *h*, and is thus trunnioned or journaled in said collars like a shaft in bearings; but the part of the key between these round supporting ends which passes through the shaft and hub is flattened or reduced from its cylindrical form, so as to correspond exactly to that part of the key-groove which lies within the shaft exclusive of the hub, as shown by full lines in Figs. 2 and 6 and by dotted lines in Fig. 3. It will therefore be seen that when the clutch-key is turned or tilted so that the reduced part lies wholly within the boundaries of the shaft, as in Figs. 2 and 3, the key will present no obstruction to the rotation of the fly-wheel hub, so that the latter can revolve freely upon the shaft, as though upon a smooth solid journal. If, however, a force be applied to tilt or turn the key in its bearings, the reduced part will tend to project across or intersect the junction of the shaft and hub, and as soon as the complementary part of the key way or groove in the hub (see Fig. 2) revolves into register with the key-groove in the shaft the clutch-key will revolve into engagement therewith, and thus clutch the fly-wheel positively with the shaft, with the effect equivalent to a positive key, as seen in Figs. 3 and 4, thus causing the shaft to revolve with the fly-wheel while the clutch-key remains thus tilted. As soon as the key is tilted back to its normal position, the wheel will be unclutched and revolve freely, while the shaft will remain at rest, as indicated in Figs. 1 and 2. Now the key is rocked or tilted one way or the other, as described, to clutch or unclutch the fly-wheel by the following means: On the end of the key which projects from the inner collar, $g$, is formed or fixed a curved or wing-shaped arm or lever, $m$, the outer curvature of which is concentric with the axis of the shaft and fly-wheel when the key is tilted into the disengaging position, as seen in Figs. 1 and 2, said curve being about coincident with the periphery of the fly-wheel hub, as shown in Figs. 1, 2, and 3. This curved lever rests normally against a stop, $n$, Figs. 1 and 3, which forms one arm of an elbow-lever pivoted on the side of the press-frame, as seen in Fig. 1, the opposite arm $n'$ of which is connected by a rod, $o$, with a treadle (not shown) at the base of the press. A spring, $p$, abuts at one end against a stop, $r$, on the collar $g$, while the opposite arm bears against the lever, and thus tends to swing out the lever into its eccentric position, as will be understood; but this is prevented by the stop $n$, which normally arrests and holds the lever concentric and the key disengaged, as in Figs. 1, 2, and 3, so that normally the fly-wheel thus revolves freely on the shaft, while the shaft $b$, with its collars $g$ $h$, and the curved lever $m$ and its key $k$, remain at rest, in the position shown in Figs. 1, 2, and 3. If, however, the operator now depresses the treadle connected with the rod $o$, the stop $n$ will be moved in the direction of the arrow, as seen in Fig. 1, and will be thus withdrawn from the curved lever $m$, which will now be swung out by the action of the spring $p$, limited by the stud $q$, into the position shown in Figs. 4 and 5, thus causing the key to revolve into engagement with the groove in the fly-wheel hub, as seen in Figs. 3 and 4, and thereby clutching the wheel to the shaft and causing the shaft to revolve positively. The operator, after thus depressing the treadle, will immediately release the same, and the stop $n$ will fly back to its normal position, which will lie in the path of the projected lever $m$ as it revolves with the collar $g$ and shaft $b$, and hence, as the shaft nears the end of one revolution, the curved edge of the lever $m$ will ride against the stop $n$, and thus become depressed back into its concentric position, which will thereby turn the clutch-key back to its disengaging position and thus unclutch the fly-wheel from the shaft, the shaft being now brought to rest at the position from which it was started. This position will usually be that which corresponds to the crank at the top of its stroke, so as to stop the press after each revolution with the plunger raised to the top of the stroke, as will be readily understood.

Now it will be readily seen that at the moment of the release of the shaft and its attachments from the fly-wheel the momentum of the parts might cause the rotation of the crank-shaft to continue, and thus run away or revolve in advance of the fly-wheel. To prevent this a retarding pawl or stop is arranged in a peculiar manner between the fly-wheel hub and one of the collars on the shaft, as well shown in Figs. 1, 3, and 4. This pawl is shown at $s$, and is made in one solid piece of steel, with its pivotal end in the form of a cylindrical boss or hub, which rests in a free pivotal manner in a corresponding cylindrical cavity, $t$, bored in the hub of the fly-wheel in a position exactly tangent to the circumference of the recess, within which the fixed collar $h$ fits, and over which the recessed part of the hub revolves. The projecting tongue of the pawl works in a rectangular recess, $t'$, cut in the hub adjacent to and opening into the cylindrical pivotal socket $t$, and also opening into the large central recess of the hub, into which the collar $h$ fits, as shown in Figs. 3 and 4. The engaging-point of the pawl rests normally against the periphery of the collar $h$, and is pressed thereagainst by a spring, $u$, which rests in a small radial cavity leading out of the cavity $t'$. On the periphery of the collar $h$ is cut a ratchet, recess, or tooth, $v$, (one or more,) with which the pawl will engage at one point in the revolution, as seen in Fig. 4, this point corresponding to that at which the clutch-key becomes engaged with the hub, as shown. The direction of this ratchet engagement is such, as will be understood from Fig. 4, that the pawl will slip freely over the collar in the direction in which the fly-wheel revolves to drive the shaft; but the pawl will engage the collar positively, if the collar and shaft should tend to revolve in the same direction independent of the fly-wheel, as will be readily understood from Fig. 4, and thus prevent the independent revolution of the shaft in the same direction as the fly-wheel. This independent revolution is sometimes likely to occur, from the fact that the clutch-key engages positively in one direction only, and because the weight of the crank and its connections when on the downstroke is sometimes sufficient to make the shaft revolve faster than the fly-wheel, and thus run away from the fly-wheel, which is, however, prevented by the pawl. It will also be readily understood that at the moment when the shaft is unclutched from the fly-wheel by the turning of the clutch-key $k$ back to its normal position the acquired momentum of the shaft and its attachments cannot carry the shaft, with its collars $g$ $h$ and clutch-key, around in advance of the fly-wheel, as this is stopped by the pawl $s$ engaging the collar $h$. The result will therefore be that at the moment of release the collar $h$ and the shaft and its attachments will revolve with the fly-wheel for a slight distance till the momentum is checked, when the collar $h$ and the shaft, &c., will come to rest and the fly-wheel will revolve freely over the same, and the pawl $s$ will slip over the collar $h$, as seen in Fig. 3. It will now be seen, referring to Fig. 3, that the long concentric curve in the lever $m$ of the clutch-key $k$ will thus allow this slight motion of the shaft with the fly-wheel due to momentum after the clutch is actually released without bringing the lever $m$ off the stop $n$, and thus passing the point at which the clutch is held released and the shaft held stationary; hence by these means the shaft will always stop at, or nearly at, the same point in the upstroke, and the fly-wheel will always become clutched and released at a uniform or nearly uniform point in the stroke of the crank, and by the same means any sudden plunges or movements of the crank and the dies therewith connected, due to sudden release and momentum, will be obviated.

By referring to Figs. 1 and 3 it will be seen that the pawl $s$ is formed with a notch, $s'$, cut in its cylindrical or pivotal end, into which projects a set-screw, $w$, which is screwed in radially from the periphery of the fly-wheel hub. This screw thus prevents the displacement of the pawl sidewise out of its socket, and it also serves to adjust the tip or motion of the pawl, for it will be seen that the bottom of this notch will strike against the tip of the screw when the pawl clicks into the ratchet-tooth, and may thus be adjusted to allow more or less motion to the pawl. I prefer, however, to so adjust the screw that the base of the notch will contact with the tip of the screw before the point of the pawl strikes against the bottom of the ratchet-recess $v$ in the collar $h$, so that when the pawl and fly-wheel hub are revolving rapidly around the shaft the slip or click of the pawl will be noiseless, or nearly so. It may now be noted that by this construction the formation and mounting of the pawl and its adjuncts are rendered very strong and simple, for, the pawl being made in one solid piece, with a solid circular pivotal end held circumferentially in a concentric circular pivot-socket, the pawl has thus a very free pivotal motion, and is yet exceedingly strong and capable of resisting heavy shocks or jars from the heavy machinery to which it is connected, without being liable to become strained or bound, as would be the case with the ordinary mode of mounting pawls on central pins or studs, and yet the construction described is cheaper and simpler than the usual method.

It will be seen on reference to Fig. 1 that the pawl-socket is sunk directly in the end of the hub, and over this end is screwed the ring $y$, which thus conceals and protects the pawl and its connections.

I do not limit myself to the exact form of the parts shown.

What I claim as my invention is—

1. The combination, with driving-shaft $b$ and driving-hub $f$, of collars $g$ $h$, fixed on the shaft at the ends of the hub, and having the circular keyway $i$ in said parts, with the rotary key $k$, fitting the same, the said hub having the pawl-socket $t$ $t'$, sunk in the end of the same, and pawl $s$, pivotally seated in said socket, and ratchet $v$, secured to shaft to engage said pawl, substantially as and for the purpose set forth.

2. The combination, with the shaft $b$ and hub $f$, having pawl-socket $t$ $t'$, of the collars $g$ $h$, fixed on the shaft and provided with the keyway $i$, the rotary key $k$, arm $m$, spring $p$ and movable stop $n$, the pawl $s$, spring $u$, and ratchet $v$, arranged and operating substantially as shown and described.

3. The combination, with a shaft, $b$, having a ratchet-rim, such as $h$, of the hub $f$, revolving on the shaft and rim, having the pawl-socket $t$ $t'$, with the pawl $s$, pivotally socketed therein, and having the notch $s'$, with the set-screw $w$, engaging said notch, substantially as shown and described.

4. The combination, with the shaft $b$ and ratchet-rim thereon, of the hub $f$, revolving on the same and formed with the pawl-socket $t$ $t'$, with the pawl $s$, having notch $s'$, the spring $u$, and set-screw $w$, arranged and operating substantially as shown and described.

5. The combination, with the shaft $b$ and ratchet collar or rim $h$, of the hub $f$, revolving on the same and recessed at the end to fit over said rim, the pawl-socket $t$ $t'$ in the end of the hub, pawl $s$, socketed therein, and ring $y$, fixed to the hub over the same, substantially as shown and described.

FRANK M. LEAVITT.

Witnesses:
JNO. E. GAVIN,
CHAS. M. HIGGINS.